United States Patent Office 3,450,758
Patented June 17, 1969

3,450,758
MANUFACTURE OF WATER-SOLUBLE AMIDES
Janice L. Greene, Orange Village, Ohio, assignor to The Standard Oil Company, Cleveland, Ohio, a corporation of Ohio
No Drawing. Filed Dec. 7, 1966, Ser. No. 599,705
Int. Cl. C07c *103/10, 103/30*
U.S. Cl. 260—561
9 Claims

ABSTRACT OF THE DISCLOSURE

Water-soluble amides are prepared by the neutralization of an aqueous solution of an amide salt with a water-immiscible organic amine or a solution of a water-immiscible organic amine in a water-immiscible solvent. The amide is then recovered from the water phase and the amine-salt is regenerated to the free amine in the solvent phase by treatment with a base.

---

This invention relates to a novel process for the preparation of water-soluble amides by neutralization of an aqueous solution of an amide salt with a water-immiscible organic amine and recovering the amide from the water solution.

The present invention is applicable to water-soluble carboxamides in general and is particularly applicable to olefinically unsaturated carboxamides such as acrylamide, methacrylamide, crotonamide, itaconamide, maleic amide and the like.

It is well known to prepare amides such as acrylamide by hydrolysis of the corresponding nitriles such as acrylonitrile with a strong mineral acid such as sulfuric acid and subsequent recovery of the acrylamide from its amide sulfate. The nitrile hydrolysis portion of this process proceeds with little difficulty to high conversions of amide sulfate, but the recovery of the amide from its sulfate presents many difficulties.

In the past it has been proposed to recover acrylamide from its sulfate by neutralization with a base such as calcium carbonate, calcium oxide, an alkali metal hydroxide such as sodium hydroxide or ammonia followed by a separation of acrylamide from the sulfate salt. The separation of acrylamide from calcium sulfate, sodium sulfate or ammonium sulfate by various means is the subject of numerous patents and publications of the prior art.

It has also been proposed to use ion exchange resins for catalyzing the hydrolsyis of acrylonitrile to acrylamide and for the selective adsorption of acrylamide from its sulfate in U.S. Patents Nos. 2,734,915 and 3,041,375. The use of ion exchange resins or other ion exchange material and particularly anion exchange material for the selective removal of sulfuric acid from aqueous solutions of acrylamide sulfate has not previously been described.

The amines useful in the present process are those which are essentially insoluble in water and those which form sulfate salts which also are essentially water-insoluble. The amines useful in the present invention as well as their sulfate salts also preferably are soluble in a water-immiscible liquid such as a hydrocarbon solvent.

According to the preferred embodiment of this invention an aqueous solution of the carboxamide sulfate is extracted with the water-immiscible amine or solution of the water-immiscible amine in a water-immiscible organic solvent to remove essentially all of the sulfuric acid from the carboxamide sulfate and the carboxamide is then recovered from the water solution by evaporation of the water or other various means. The water solution of the carboxamide and especially a water solution of acrylamide may be useful per se in the preparation of polymers and copolymers with other monomers.

The amine sulfate extraction medium can then be regenerated to the free amine readily for further use in the foregoing process by treatment with a basic material such as sodium hydroxide, ammonia, etc. Ammonia is a preferred basic material for regeneration of the amine because the ammonium sulfate formed as by-product is readily marketable as a fertilizer component.

The present process is applicable to amides having the structure

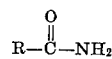

wherein R is hydrogen, an alkyl or an olefinic group having from 1 to 5 carbon atoms. The process is particularly applicable to the preparation of olefinic carboxamides and more particularly acrylamide and methacrylamide.

The amine useful for removal of sulfuric acid or the sulfate ion from the amide sulfate may be a primary, secondary, or tertiary amine containing an alkyl, cycloalkyl, alkaryl, arylalkyl group or some combination of these groups. It is preferred that the amine be an alkyl amine and that the alkyl group be branched. The water-solubility of the amine or the amine sulfate should not exceed about 1%. Generally it is preferred that the amine be a branched alkyl amine containing at least 18 carbon atoms. Most preferred are amines having the structure

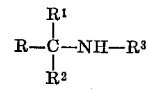

wherein R, $R^1$ and $R^2$ are alkyl groups having a total of from about 10 to 30 carbon atoms, and $R^3$ is hydrogen or an alkyl group having from 1 to 14 carbon atoms. Also useful in this invention but less preferred are amines having the structure

wherein the $R^4$ groups are alkyl groups having a total of from 10 to 30 carbon atoms.

The amines useful in the present invention can be liquid or solid. Unexpectedly, the instant process does not work satisfactorily when conventional anion exchange resins are used in place of the amines because the resins adsorb large amounts of acrylamide as well as the sulfate from the aqueous acrylamide sulfate solution and usually only about half of the acrylamide can be recovered from the original acrylamide sulfate solution when an anion exchange resin is employed.

The amines useful in this invention usually are dissolved in a solvent which is no more than 5% soluble in water and is inert toward both the amide sulfate and the amine. Preferred solvents of this type include aliphatic, cycloalkyl, or aromatic hydrocarbons and mixtures thereof, as for example, kerosine, iso-octane, cyclohexane, dodecane, toluene, etc. The amine preferably is dissolved in the solvent to the extent of about 10–50% by weight of the solvent. The amine solution is contacted with the aqueous acrylamide sulfate solution at temperatures no greater than about 70° C. These lower temperatures are preferred to prevent the hydrolysis of acrylamide sulfate to acrylic acid and also to minimize or prevent formation of polymer.

The concentration of the various reagents in the instant process is not critical but depends on their relative solubilities. It is advantageous that the concentration of the amide sulfate in the aqueous solution be at a maximum in order to minimize the handling of process water. Although the acrylamide sulfate solution may contain from zero to 99% by weight of water, it is preferred to employ solutions in the range of about 50% or higher solids concentration. The amount of amine used can be less than, equal to, or greater than the stoichiometric equivalents of sulfuric acid present.

The acrylamide sulfate may be contacted with the amine-hydrocarbon solution in a separate reaction vessel and the resulting mixture may then be extracted with water in a suitable extraction apparatus, as an extraction column or a centrifugal extractor. Alternately, the contacting of the amine-hydrocarbon solution with the acrylamide sulfate and the water extraction may be conducted simultaneously in the same reaction vessel.

In one method of operating the solution of the acrylamide sulfate is fed to the top of a liquid-liquid extraction column and the hydrocarbon solution of the amine is fed to the bottom of the column. The acrylamide sulfate solution is contacted in a counter-current fashion with the hydrocarbon solution of the amine. This may be a multistage operation if desired. The hydrocarbon stream containing the dissolved amine sulfate is removed from the top of the column and is scrubbed with water. A small amount of acrylamide may be physically absorbed into the hydrocarbon phase, but this can be removed by repeated water extractions leading to a 99% recovery of acrylamide. The water-wash is combined with the spent aqueous stream issuing from the bottom of the extraction tower, and the water is removed by flash evaporation to obtain a concentrated solution of the acrylamide. The acrylamide is then crystallized by cooling. The hydrocarbon phase from the water scrubber is treated with stoichiometric amounts up to about 10% excess of anhydrous or aqueous ammonia to regenerate the amine and to recover ammonium sulfate in the water phase. The ammonium sulfate may precipitate immediately in a crystalline form when anhydrous ammonia is used or it may be recovered by evaporation of the aqueous solution when aqueous ammonia is used for the regeneration. The hydrocarbon solution containing the regenerated amine can be recycled to the extraction column.

It is essential that the excess ammonia be removed from the hydrocarbon-amine solution before it is recycled to the extraction column since the ammonia reacts with the acrylamide sulfate to form a by-product nitrilotrispropionamide. The excess ammonia can be removed from the regenerated amine by bubbling air through the solution or heating the agitated solution to a temperature of about 40–100° C. or by water extraction.

The process of this invention is further illustrated in the following examples wherein the amounts of ingredients are expressed in parts by weight unless otherwise indicated.

EXAMPLE I 108.45 grams of a 7.8% by weight solution of acrylamide sulfate in water was treated with 95 g. of a 44.8% by weight solution of Amberlite XLA–3 in dodecane for a period of one hour at about 25° C. Amberlite XLA–3 is a liquid, highly branched, high molecular weight, oil-soluble primary amine having from 23–26 carbon atoms and an equivalent weight of 350±5 supplied by Rohm & Haas Company having the structure

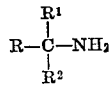

wherein R, $R^1$ and $R^2$ are alkyl groups and the sum of the carbon atoms in $R+R^1+R^2$ is from 22–25. The temperature of the reaction mixture rose 11°. The two phases were separated, and the hydrocarbon phase was washed with three fifty ml. portions of water. The total aqueous extract equivalent to 237 g. was evaporated under 10 mm. pressure at 40–50° C. to give 3.505 grams of acrylamide (98.8% recovery). The hydrocarbon layer was dried with anhydrous calcium sulfate and treated with six grams of gaseous anhydrous ammonia to give 6.13 grams (93% recovery) of solid ammonium sulfate.

EXAMPLE II 126 grams of a 47.6% by weight solution of acrylamide sulfate in water were treated with 598 grams of a 49.8% by weight solution of Amberlite XLA–3 in kerosine for one hour at room temperature. The exotherm of the reaction mixture was 30° C. A single phase resulted and this was washed with four 100 ml. portions of water. The combined aqueous extract weighing 791 grams was evaporated at 40° C. under vacuum to give 22.4 grams of acrylamide (90% yield). The hydrocarbon layer was treated with 100 ml. of concentrated ammonium hydroxide to give an aqueous solution from which 47.3 grams (101.5% recovery) of ammonium sulfate was obtained.

EXAMPLE III 60.9 grams of a 47.6% by weight solution of acrylamide sulfate were treated with 320 grams of a 50% by weight solution of Amberlite LA–2 in kerosine. Amberlite LA–2, available commercially from Rohm & Haas Company, is a highly branched, liquid, secondary amine with an equivalent weight of 360 to 390 having the structure

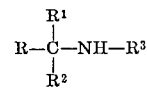

wherein R, $R^1$, $R^2$ and $R^3$ are alkyl groups, $R^3$ is $C_{12}$, and the sum of the carbon atoms in R, $R^1$ and $R^2$ is from 11–14. These two solutions were contacted for one hour at about 25° C. to give a two-phase system which was separated, and the hydrocarbon phase was washed with 200 grams of water. The combined aqueous layer was evaporated to give 8.26 g. of acrylamide (94% yield). The hydrocarbon layer was treated with 50 ml. of concentrated ammonium hydroxide, and the immiscible layers were separated to give 24.25 g. (104% yield) of ammonium sulfate after evaporation of the water from the aqueous solution.

EXAMPLE IV

This example describes a process employing a conventional ion exchange resin and is outside the scope of the present invention. 8.85 grams of acrylamide sulfate in 100 ml. of water were added to a mixture of 50 g. of Amberlite IR–45 anion exchange resin. (Amberlite IR–45 is a weakly basic ion exchange resin also supplied commercially by Rohm & Haas Company.) The resulting slurry was stirred for two hours and 96% of the acid present was neutralized. 54.3% by weight of the theoretical amount of acrylamide was recovered from the aqueous solution. The ion exchange resin was washed with two 100 ml. portions of water in an attempt to remove the remainder of the acrylamide from the surface of the resin but no additional amide was recovered.

EXAMPLE V

A mixture containing a primary amine having the structure

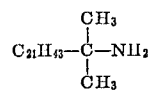

was prepared as follows: 200 grams of 98% $H_2SO_4$ (2 moles) were added drop-wise to a mixture of 336 grams (1.1 moles) of polyisobutylene having an average carbon content of $C_{24}$, 65 grams of NaCN (1.1 mole) and 54 grams of water (3 moles) over a period of about two hours while maintaining the reaction temperature between 10 to 20° C. The resulting mixture was stirred at room temperature overnight and then was heated under reflux for about 27 hours at from 28–42° C. The unreacted HCN was then removed by distillation and the resulting mixture was heated for 17 hours at 45–55° C. The reaction mixture was then cooled and 200 ml. of water were added to it over a period of about 15 minutes while the temperature of the reaction mixture was maintained below 15° C. The reaction mixture was then refluxed for 2 hours, during which time the pot temperature was maintained at 107–109° C. The reaction mixture was then neutralized by the addition of 470 grams of 30% NaOH solution over a period of two hours. During the neutralization the temperature of the reaction mixture was held below 25° C. The organic product was then isolated, washed with water until the washings had a constant pH (in the range of 9–10) and dried over MgSO$_4$. The amine-containing product weighed 253 grams.

The foregoing liquid, amine-containing product was used in the preparation of acrylamide as follows: A mixture of 1.66 grams of acrylamide sulfate (19.65 millimoles of acrylamide, 44.6875 milliequivalents or meq. of sulfuric acid), 112 grams of water, 200 grams of the liquid, amine-containing product from above (47.921 meq. of amine) and 150 grams of isooctane was equilibrated at room temperature by shaking for 30 minutes and the layers were then separated by centrifugation and decantation. The hydrocarbon layer was washed three times with 100 ml. portions of water and all of the water layers were combined. Analysis of the aqueous solutions showed that 99.86% of the sulfuric acid originally present in the acrylamide sulfate had been removed by this treatment and that 97.98% of the acrylamide originally present in the acrylamide sulfate was in the water layer.

Regeneration of the hydrocarbon layer by washing with 100 ml. of dilute ammonium hydroxide was carried out. The aqueous layer from the regeneration treatment was found to contain 3.03 grams of (NH$_4$)$_2$SO$_4$ which is about 100% of theory.

FIGURE VI 100 ml. of a 50% solution of a tertiary amine (having the structure R$_3$—N wherein the R's contain a total of from 24–30 carbon atoms) in isooctane which had a total of 95.6 meq. of amine was mixed with 7 ml. of an acrylamide sulfate solution containing 82.5 meq. of sulfuric acid and 34.5 milliequivalents of acrylamide, and the mixture was shaken at room temperature for 30 minutes. The layers were separated and the organic layer was washed with five 100 ml. portions of water. The combined water layers contained 84.8% of the acrylamide originally present in the acrylamide sulfate solution. The amine layer was readily regenerated for further use by treatment with ammonium hydroxide as in Example V.

EXAMPLE VII 100 ml. of a 42% solution of a primary amine having the structure

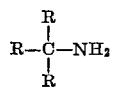

wherein the combined R's contain from 17–21 carbon atoms in isooctane which contained 100 milliequivalents of amine was mixed with 8 ml. of an acrylamide sulfate solution containing 92.2 meq. of sulfuric acid and 40.2 meq. of acrylamide and the mixture was shaken at room temperature for 30 minutes. The mixture was washed with five 100 ml. portions of water, the layers were separated after each wash and the aqueous layers were combined. 100% of the acrylamide originally present in the acrylamide sulfate was present in the combined water layers and the amine was easily regenerated for further use by means of an ammonium hydroxide wash.

I claim:
1. A process for recovering carboxamides having the structure

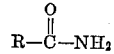

wherein R is hydrogen, alkyl or olefin having from 1 to 5 carbon atoms from the corresponding carboxamide sulfate comprising contacting the the carboxamide sulfate in an aqueous solution with a water-immiscible amine having the structure (A) 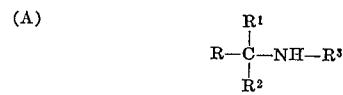

wherein R, R$^1$ and R$^2$ are alkyl containing a total of from about 10 to 30 carbon atoms and R$^3$ is hydrogen or alkyl containing from 1 to 14 carbon atoms or (B) (R$^4$)$_3$N wherein R$^4$ are alkyl containing a total of from 10 to 30 carbon atoms contained in a water-immiscible hydrocarbon solvent and separating the carboxamide from the amine sulfate.

2. The process of claim 1 wherein the amine is dissolved in an aliphatic, cycloalkyl or aromatic hydrocarbon solvent.

3. The process of claim 2 conducted at a temperature no greater than about 70° C.

4. The process of claim 3 wherein the carboxamide is acrylamide.

5. The process of claim 3 wherein the carboxamide is methacrylamide.

6. The process of claim 4 wherein the amine has an equivalent weight of from 345 to 355 and the structure

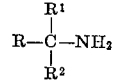

wherein R, R$^1$ and R$^2$ are alkyl containing a total of from 22–25 carbon atoms.

7. The process of claim 4 wherein the amine has an equivalent weight of from 360 to 390 and the structure

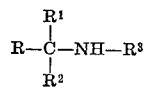

wherein R, R$^1$ and R$^2$ are alkyl containing a total of from 11–14 carbon atoms and R$^3$ is alkyl having 12 carbon atoms.

8. The process of claim 4 wherein the amine has the structure

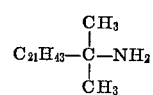

9. The process of claim 4 wherein the amine has the structure

wherein the R's are alkyl containing a total of from 24 to 30 carbon atoms.

References Cited

UNITED STATES PATENTS 3,008,990   11/1961   Weiss _____ 260—561

ALEX MAZEL, *Primary Examiner.*

J. A. NARCAVAGE, *Assistant Examiner.*